(12) United States Patent
Ducellier et al.

(10) Patent No.: US 6,657,785 B2
(45) Date of Patent: Dec. 2, 2003

(54) BI-DIRECTIONAL CIRCULATOR

(75) Inventors: Thomas Ducellier, Ottawa (CA);
Kuochou Tai, Fremont, CA (US);
Kok-Wai Chang, Los Altos, CA (US);
Jyehong Chen, Mt. Holly, NJ (US);
Yihao Cheng, Nepean (CA)

(73) Assignees: JDS Uniphase Inc., Nepean (CA); JDS Uniphase Corporation, San Jose, CA (US)

( * ) Notice: Subject to any disclaimer, the term of this patent is extended or adjusted under 35 U.S.C. 154(b) by 135 days.

(21) Appl. No.: 09/933,165

(22) Filed: Aug. 21, 2001

(65) Prior Publication Data

US 2002/0024730 A1 Feb. 28, 2002

Related U.S. Application Data (63) Continuation-in-part of application No. 09/645,863, filed on Aug. 24, 2000, now abandoned.
(60) Provisional application No. 60/227,029, filed on Aug. 23, 2000.

(51) Int. Cl.[7] .................................................. G02B 5/30
(52) U.S. Cl. ........................ 359/484; 359/497; 359/122; 359/127; 385/11; 385/31; 385/341
(58) Field of Search ................................. 359/484, 497, 359/341, 122, 124, 127, 129; 385/11, 16, 31

(56) References Cited

U.S. PATENT DOCUMENTS

| 5,909,295 A | 6/1999 | Li et al. ..................... 359/130 |
| 5,930,422 A | 7/1999 | Cheng et al. ................. 385/47 |
| 6,160,660 A | * 12/2000 | Aina et al. ................... 359/341 |

FOREIGN PATENT DOCUMENTS

| EP | 0 638 837 A1 | 2/1995 |

OTHER PUBLICATIONS

K. Tai et al., "Wavelength–Interleaving Bidirectional Circulators", IEEE Photonics Technology Letters, vol. 13, No. 4, Apr. 2001, pp. 320–322.

* cited by examiner

*Primary Examiner*—Audrey Chang
*Assistant Examiner*—Craig Curtis (57) ABSTRACT

The present invention relates to bi-directional circulators based on interleaver technology, e.g. birefringent crystal interleaver technology, that enables signals containing even number ITU channels to travel in one direction through the device, while signals containing odd number ITU channels travel in the opposite direction. Open and closed three and four port devices are disclosed, as well as several useful implementations of the three port device in combination with other optical components, which result in hybrid uni-directional and bi-directional devices.

19 Claims, 12 Drawing Sheets

BI-DIRECTIONAL CIRCULATOR

CROSS-REFERENCE TO RELATED APPLICATIONS

This application claims priority from Provisional Application No. 60/227,029 filed Aug. 23, 2000, and is a continuation-in-part of U.S. patent application Ser. No. 09/645,863 filed Aug. 24, 2000.

TECHNICAL FIELD

The present application relates to a bi-directional optical circulator, and in particular to a bi-directional wavelength interleaving optical circulator for directing signals with channels from a first set of channels in one direction, while directing signals with channels from a second set of channels in another direction.

BACKGROUND OF THE INVENTION

Figure 1:
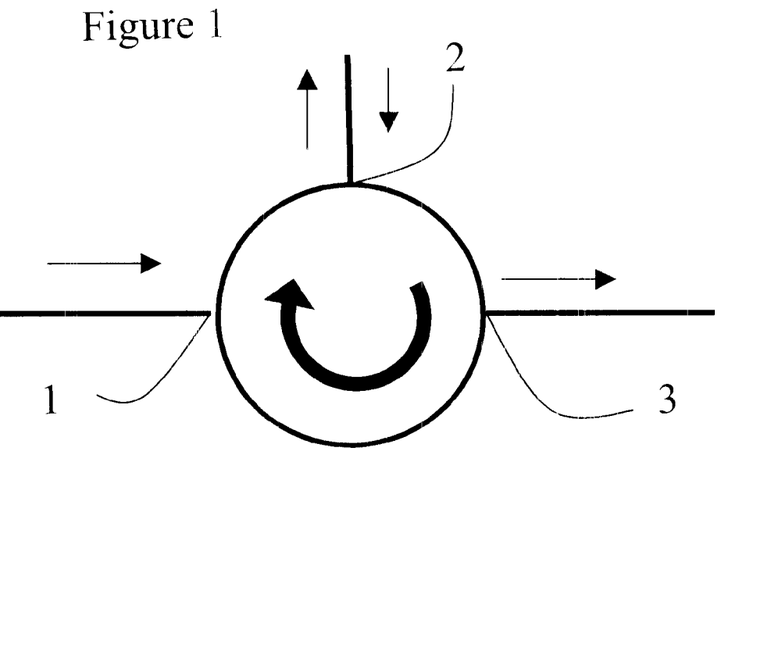
FIG. 1 is a conceptual illustration of a conventional three port circulator.

Conventional optical circulators, such as the one disclosed in U.S. Pat. No. 5,204,771 issued Apr. 20, 1993 in the name of Masafumi Koga, rely on reciprocal and non-reciprocal rotators as well as birefringent crystals to alter the polarization of sub-beams and direct them to the appropriate output port. In conventional circulators, illustrated conceptually in FIG. 1, signals entering a first port 1 are output a second port 2, while signals entering the second port 2 are output a third port 3. Systems that have optical traffic traveling in both directions, i.e. from the third port to the second port, and from the second port to the first port, require a second circulator to accommodate the second stream of signals.

An object of the present invention is to provide a bi-directional optical circulator for circulating two different sets of optical channels in opposite directions.

SUMMARY OF THE INVENTION

Accordingly, the present invention relates to a bi-directional circulator device comprising:

a first port for inputting a first signal comprising at least one channel from a first set of channels, and for outputting a second signal comprising at least one channel from a second set of channels, which is independent of the first set of channels;

a second port for inputting a third signal comprising at least one channel from the first set of channels, for inputting the second signal comprising at least one channel from the second set of channels, for outputting the first signal comprising at least one channel from the first set of channels, and for outputting a fourth signal comprising at least one channel from the second set of channels;

a third port for inputting the fourth signal comprising at least one channel from the second set of channels, and for outputting the third signal comprising at least one channel from the first set of channels;

wavelength-selective polarization-rotating means optically coupled to the first, second and third ports for rotating the polarization of the channels in one of the first or the second set of channels, while having no cumulative effect on the polarization of the channels in the other set of channels; and polarization-dependent signal directing means for directing the first and third signals exiting the wavelength-selective polarization-rotating means to the second and the third ports, respectively, and for directing the second and fourth signals exiting the wavelength-selective polarization-rotating means to the first and the second ports, respectively.

Another aspect of the present invention relates to A four port closed optical circulator device comprising:

a first port for inputting a first signal comprising at least one channel from a first set of channels or for inputting a second signal comprising at least one channel from a second set of channels, which are independent from the first set of channels, said first port comprising first polarizing means for orienting the first and second signals with a first polarization;

a second port for inputting a third signal comprising at least one channel from the first set of channels or for inputting a fourth signal comprising at least one channel from the second set of channels, said second port comprising a second polarizing means for orienting the third and fourth signals with the first polarization;

a third port for inputting a fifth signal comprising at least one channel from the first set of channels or for inputting a sixth signal comprising at least one channel from the second set of channels, said third port comprising a third polarizing means for orienting the fifth and sixth signals with a second polarization, which is orthogonal to the first polarization;

a fourth port for inputting a seventh signal comprising at least one channel from the first set of channels or for inputting an eighth signal comprising at least one channel from the second set of channels, said fourth port comprising a fourth polarizing means for orienting the seventh and eighth signals with the second polarization;

wavelength-selective polarization-rotating means optically coupled to the first, second, third and fourth ports for rotating the polarization of the channels in one of the first or the second set of channels, while having no substantial cumulative effect on the polarization of the channels in the other set of channels;

first beam directing means for directing the first, second, fifth and sixth signals along a main optical path through the wavelength-selective polarization rotating means, for directing the fourth and seventh signals to the first port, and for directing the third and eighth signals to the third port;

second beam directing means for directing the third, fourth, seventh and eighth signals along the main optical path through the wavelength-selective polarization rotating means in a direction opposite to the first, second, fifth and sixth signals, for directing the first and sixth signals to the second port, and for directing the second and fifth signals to the fourth port; and non-reciprocal polarization rotating means for rotating the polarization of the third, fourth, seventh and eighth signals by 90°, while having no cumulative effect on the first, second, fifth and sixth signals.

BRIEF DESCRIPTION OF THE DRAWINGS

The invention will be further described with reference to the accompanying drawings which represent a preferred embodiment thereof, wherein.

DETAILED DESCRIPTION OF THE PREFERRED EMBODIMENT

Figure 2:
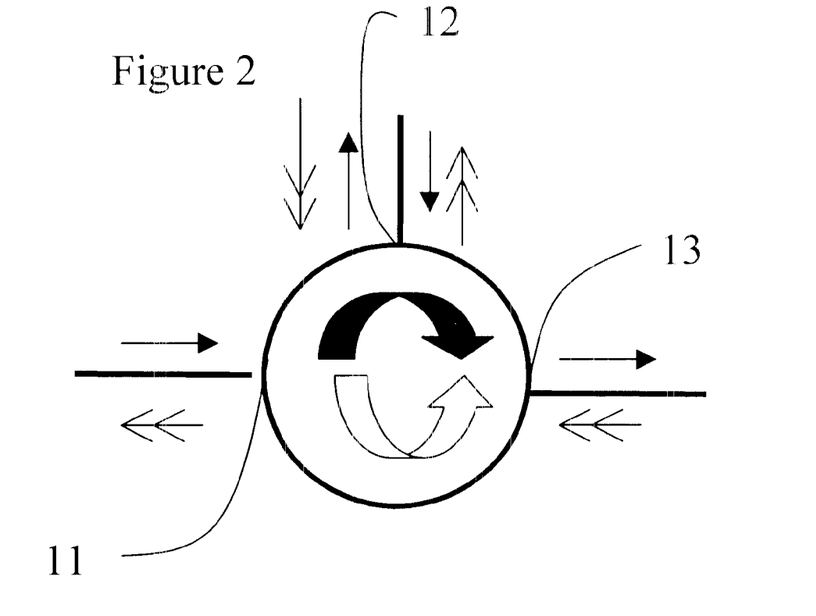
FIG. 2 is a conceptual illustration of a three port circulator according to the present invention.

The bi-directional optical circulator according to the present invention, which is illustrated conceptually in FIG. 2, includes a first port 11, a second port 12, and a third port 13. Signals, which comprise at least one of a first set of channels (single arrow), travel in one direction from the first port 11 to the second port 12, and from the second port 12 to the third port 13. However, signals, which comprise at least one of a second set of channels (double arrow), travel in the opposite direction from the third port 13 to the second port 12, and from the second port 12 to the first port 11. Typically, the first set of channels is the odd ITU channels, while the second set of channels is the even ITU channels; however, other sets of optical frequencies are possible.

Figures 3, 4:
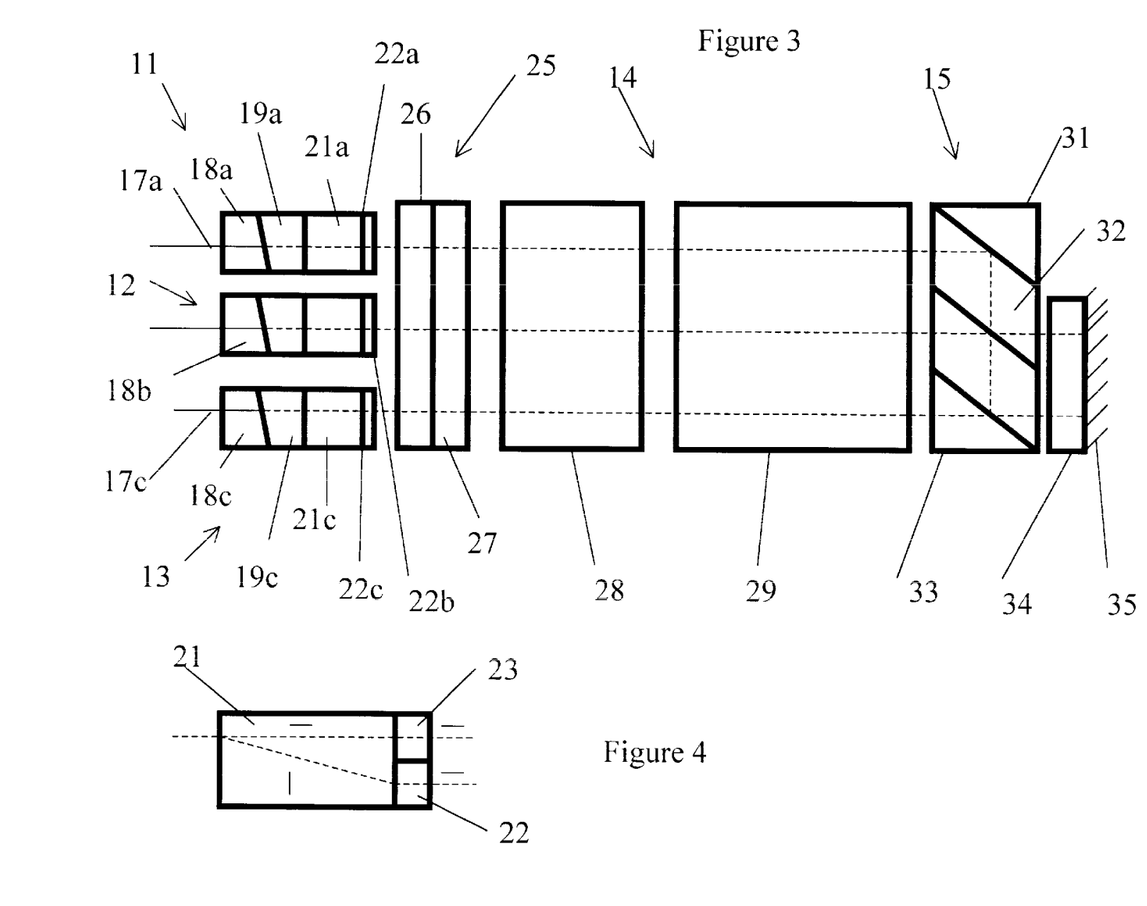
FIG. 3 is a schematic top view of a bi-directional circulator according to the present invention.
FIG. 4 is a schematic side view of a port from the bi-directional circulator of FIG. 3.

With reference to FIG. 3, the three port optical circulator according to the present invention includes the first port 11, the second port 12, the third port 13, a birefringent stack 14, and a beam-directing polarization beam-splitter stack 15. Ends of optical fibers 17a, 17b and 17c, which are mounted in ferrules 18a, 18b and 18c, respectively, launch and receive optical signals via collimating/focusing lenses 19a, 19b and 19c, respectively. Walk-off crystals 21a, 21b and 21c are use to split input beams of light launched from the fibers 17a, 17b, and 17c into two orthogonally polarized sub-beams or for combining two orthogonally polarized sub-beams into a single beam for output. The illustrated and most convenient method for splitting and combining the beams utilizes walk-off crystals 21a, 21b and 21c, e.g. rutile, YVO$_4$, however other methods are conceivable such as polarization beam splitting cubes. Half-wave plates 22a, 22b and 22c are positioned in the path of one of each pair of sub-beams entering or exiting the device, so that the two sub-beams entering the device can be set with parallel states of polarization, while each pair of sub-beams exiting the device have orthogonal polarizations. FIG. 4 more clearly illustrates the splitting/combining of the beam, as well as the position of the waveplates 22a, 22b and 22c. To facilitate assembly, glass spacers 23a, 23b and 23c (only one of which is shown) are positioned adjacent to the waveplates 22a, 22b and 22c, respectively. Other wave plate arrangements are conceivable to ensure both sub-beams have the same polarization, i.e. rotating the polarization of both sub-beams by 45° in opposite directions.

A non-reciprocal rotator 25, comprising a Faraday rotator 26 and a conventional half-wave plate 27, is positioned in the path of all incoming and outgoing signals. For incoming beams, the half-wave plate 27 is arranged to rotate the polarization of the sub-beams by an equal amount but in the opposite direction as the Faraday rotator 26, whereby there is no cumulative effect on the polarization of sub-beams input directly from the first, second or third ports 11, 12 or 13. However, for outgoing sub-beams the Faraday rotator 26 and the half-wave plate 27 rotate the polarization of the sub-beams in the same direction, resulting in the state of polarization of all outgoing beams being rotated by 90°, which sets the sub-beams to the appropriate polarization for recombination and output.

The birefringent stack 14 is preferably comprised of a first birefringent element 28 of length L arranged at an angle of 45° to the incoming sub-beams, and a second birefringent element 29 of length 2L arranged at an angle of 105°. Other arrangements with more elements and different angles are possible in accordance with known teachings.

This birefringent stack arrangement results in the odd channels undergoing a polarization rotation of 90°, while having no cumulative effect on the even number channels, i.e. the birefringent stack is a wavelength selective polarization rotator. It is also possible to design the system to rotate the even channels, while leaving the odd channels unaffected. The preferred embodiment is based on birefringent crystal channel interleaving technology; however, it is also conceivable to utilize any of the other interleaver technologies in the present invention, e.g. lattice filter interleavers; Michelson-Gires-Tournois interleavers, such as those disclosed in U.S. Pat. No. 6,169,626 issued to Chen et al, which is incorporated herein by reference; and Birefringent-Gires-Tournois interleavers, such as those disclosed in U.S. Pat. No. 6,169,604, which is incorporated herein by reference.

The stack of polarization beam splitters (PBS) 15 is comprised of an upper PBS 31, a middle PBS 32 and a lower PBS 33. Each of the PBS's is designed to reflect light of a certain polarization, e.g. horizontal, and pass light of the orthogonal polarization, e.g. vertical. A quarter wave plate 34 with mirrored surface 35 is positioned adjacent the stack of polarization beam splitters 15 for redirecting the sub-beams back through the birefringent stack 14, while rotating the polarization of the sub-beams directed therethrough by 90°.

In operation, a first signal comprised of one or more odd channels is launched via the first port 11. The signal is divided into two orthogonal sub-beams by walk-off crystal 21a, and half wave plate 22a rotates one of the sub-beams so that both sub-beams have the same polarization. The sub-beams pass through the non-reciprocal rotator 25 unchanged, before entering the birefringent stack 14. Since the signal in question is comprised of odd channels, passage through the birefringent stack results in a rotation of the state of polarization of 90°, e.g. if the sub-beams were originally vertically polarized, they become horizontally polarized. As stated above, the partially reflective surface of the upper PBS 31 is designed to reflect horizontally polarized light. Accordingly, the sub-beams are reflected to the middle PBS 32, which in turn, reflects the sub-beams through the quarter wave plate 34. After two passes through the quarter wave plate 34 the sub-beams become vertically polarized again. The reflective surface 35 directs the now vertically polarized sub-beams through the middle PBS 32 back through the birefringent stack 14 for a second pass. As before, passage through the birefringent stack results in a change in the state of polarization of the odd channels of 90°, whereby the sub-beams exit the birefringent stack 14 horizontally polarized. Because the ports are designed to combine vertically polarized sub-beams, the non-reciprocal rotator 25 is now utilized to rotate the polarization of both sub-beams from horizontal to vertical. Subsequently, the polarization of one of the sub-beams is rotated back to horizontal by wave plate 22b, and the sub-beams are combined in walk-off crystal 21b for output via lens 19b and fiber 17b of the second port 12. Similarly, if a signal comprising odd channels is launched via the second port 12, it would undergo the same polarization rotations and travel along a path parallel to the first signal described above to the third port 13.

Now we will consider the case of a second signal comprising at least one channel from a second set of channels, e.g. the even ITU channels, launched via the second port. The signal will be split into orthogonally polarized sub-beams by the walk-off crystal 21b, and the polarization of one of the sub-beams will be rotated by the wave plate 22b so that the sub-beams have parallel polarizations, e.g. vertical, as described above for the odd channels. However, when the second signal exits the birefringent stack 14, the polarization of the channels is the same as when they entered. Accordingly, the sub-beams of the second signal pass straight through the middle PBS 32, undergo a 90° rotation during two passes through a wave plate 34 (e.g. from vertical to horizontal), and are reflected back to the middle PBS 32 by the reflective surface 35. Since the sub-beams are now horizontally polarized, they are reflected by the middle PBS 32 towards the upper PBS 31, which in turn reflects the sub-beams back through the birefringent stack 14 for a second pass. Again, the birefringent stack 14 has no resultant effect on the polarization of the even channels, whereby they exit the birefringent stack 14 still horizontally polarized. As above, the non-reciprocal rotator then rotates the polarization of the sub-beams, so that they can be combined in walk-off crystal 21a and output fiber 17a. Similarly, if a another signal with even ITU channels is input the third port 13, it would undergo the same polarization rotations and follow a path parallel to the second signal described above for output via the second port 12.

Figure 5:
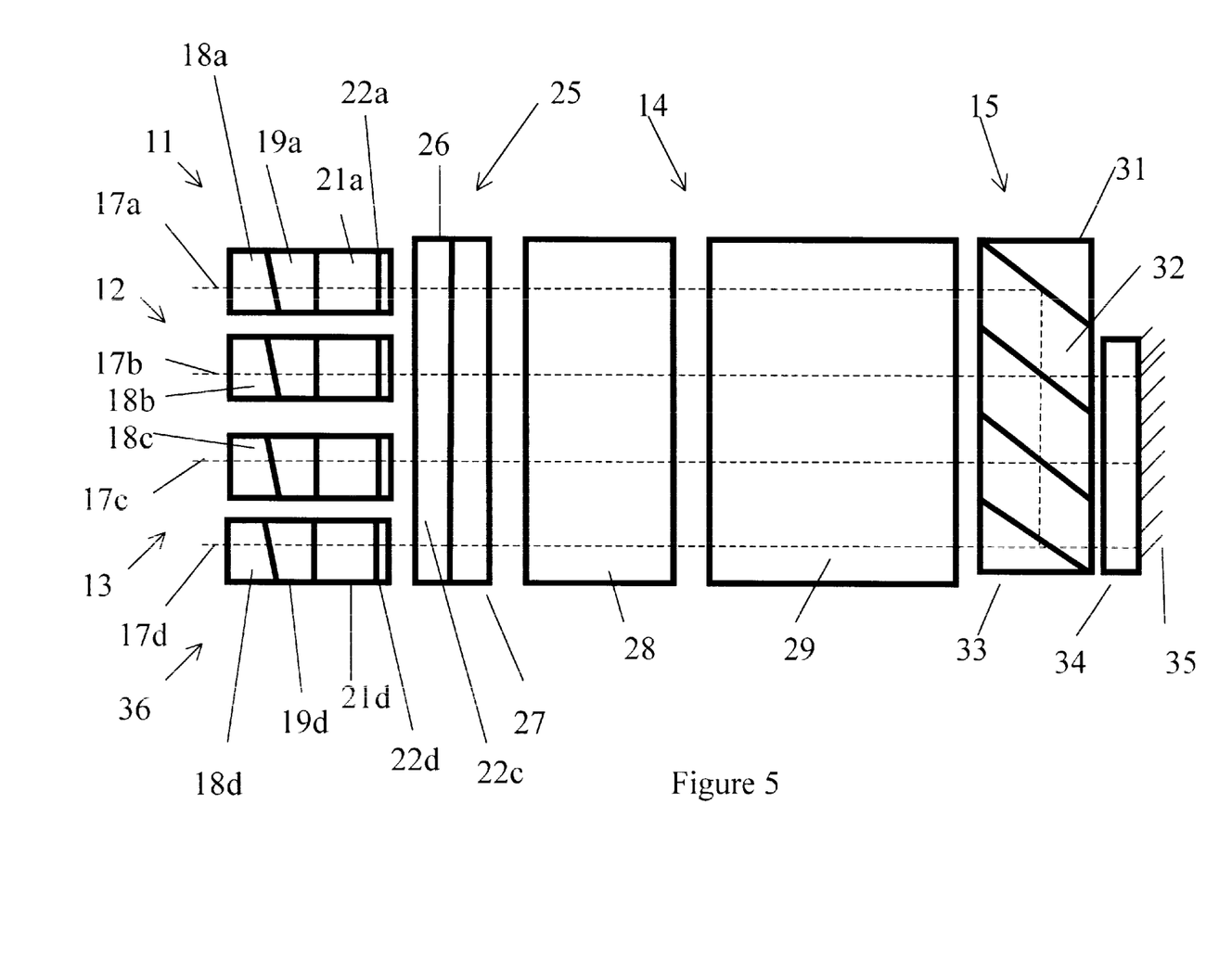
FIG. 5 is a schematic side view of a four port circulator based on the bi-directional circulator of FIGS. 3 and 4.

As exemplified in FIG. 5, with the aforementioned arrangement it is possible to add on additional ports, as required. The four port circulator of FIG. 5 includes all the elements of the three port circulator of FIG. 4, along with a fourth port 36, a fiber 17d, a ferrule 18d, a lens 19d, a walk-off crystal 21d, and a quarter wave plate 22d. Following the example detailed above, a signal with odd ITU channels launched through the third port 13 would exit via the fourth port 36, while a signal with even ITU channels launched through the fourth port 36 would exit via the third port 13.

Figure 6:
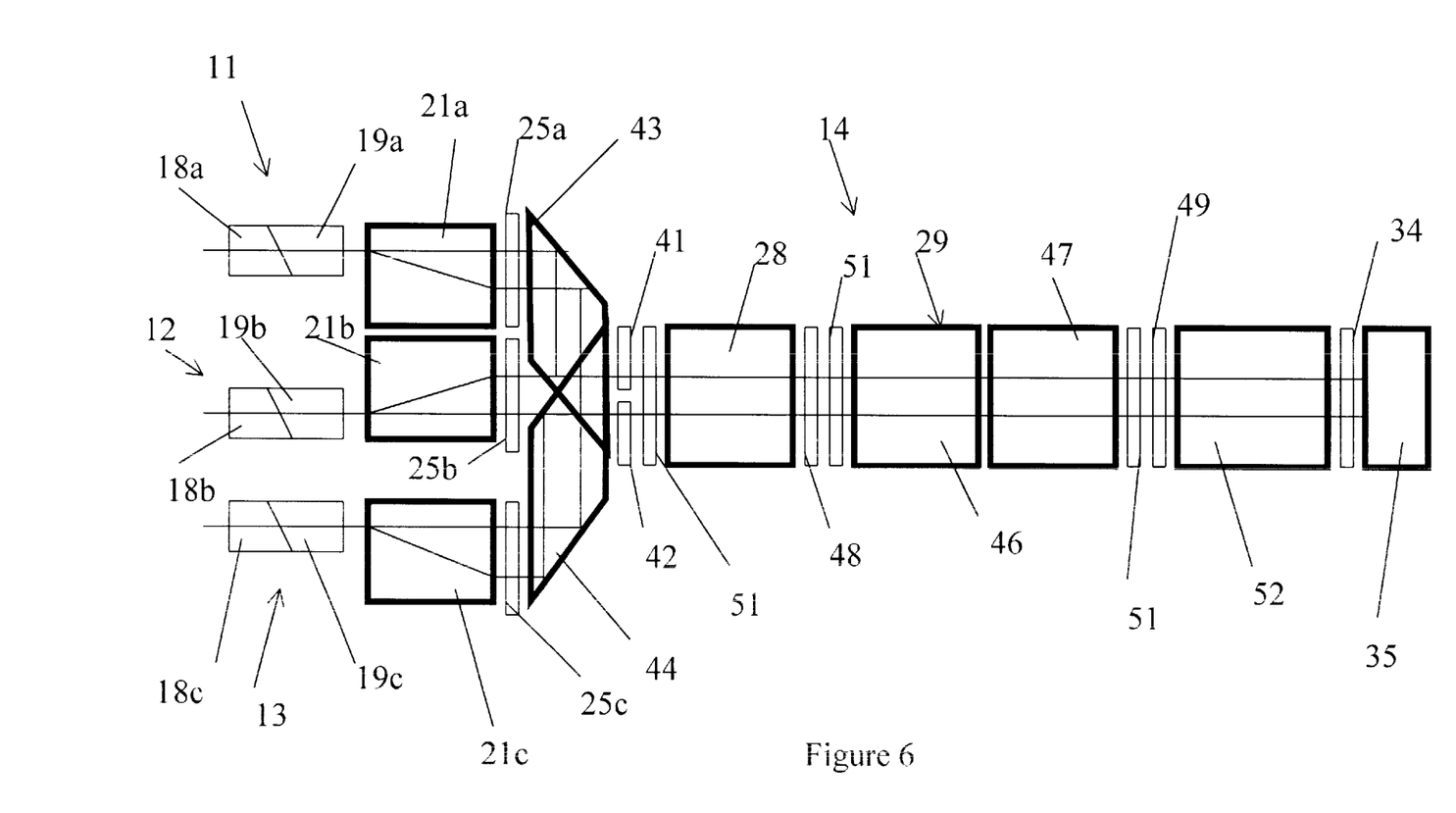
FIG. 6 is a schematic top view of another embodiment of a bi-directional circulator according to the present invention.

FIG. 6 illustrates another embodiment of a three-port circulator, which performs functionally similar to the embodiment of FIG. 3, but with a few minor variations in structure. Half waveplates 22a, 22b and 22c are replaced by waveplates 41 and 42, which are oriented to rotate the polarizations of the two sub-beams passing therethrough in opposite directions by 45°. This arrangement ensures that the orthogonally polarized sub-beams entering via the first, second or third ports 11, 12 or 13 have parallel polarizations prior to entering the birefringent stack 14, and that the like-polarized sub-beams exiting the birefringent stack 14 become orthogonally polarized.

One large non-reciprocal rotator 25 is replaced by three individual non-reciprocal rotators 25a, 25b and 25c, one at each port. In addition, reflective prisms 43 and 44 are utilized to direct the sub-beams to and from the first and third ports 11 and 13, respectively, thereby enabling a much smaller sized birefringent stack 14 to be used.

In this embodiment the second birefringent element 29 is comprised of two similar elements 46 and 47, which are also similar to the first birefringent element 28. The combination of elements 46 and 47 provide the desired length 2L. Moreover, each of the birefringent elements 46 and 28 can be constructed out of a plurality of birefringent crystals, which are selected to provide improved thermal stability over a range of operating temperatures, e.g. one part $YVO_4$ and one part $TiO_2$.

Unlike the previous embodiment illustrated in FIG. 3, the optical axes of the birefringent elements 28, 46 and 47 are all aligned, while waveplates 41, 42, 48 and 49 ensure that the sub-beams are at the proper angle relative thereto. Tuning plates 51 are also provided to enable fine tuning of the sub-beams at the various stages throughout the birefringent stack 14.

Figure 7:
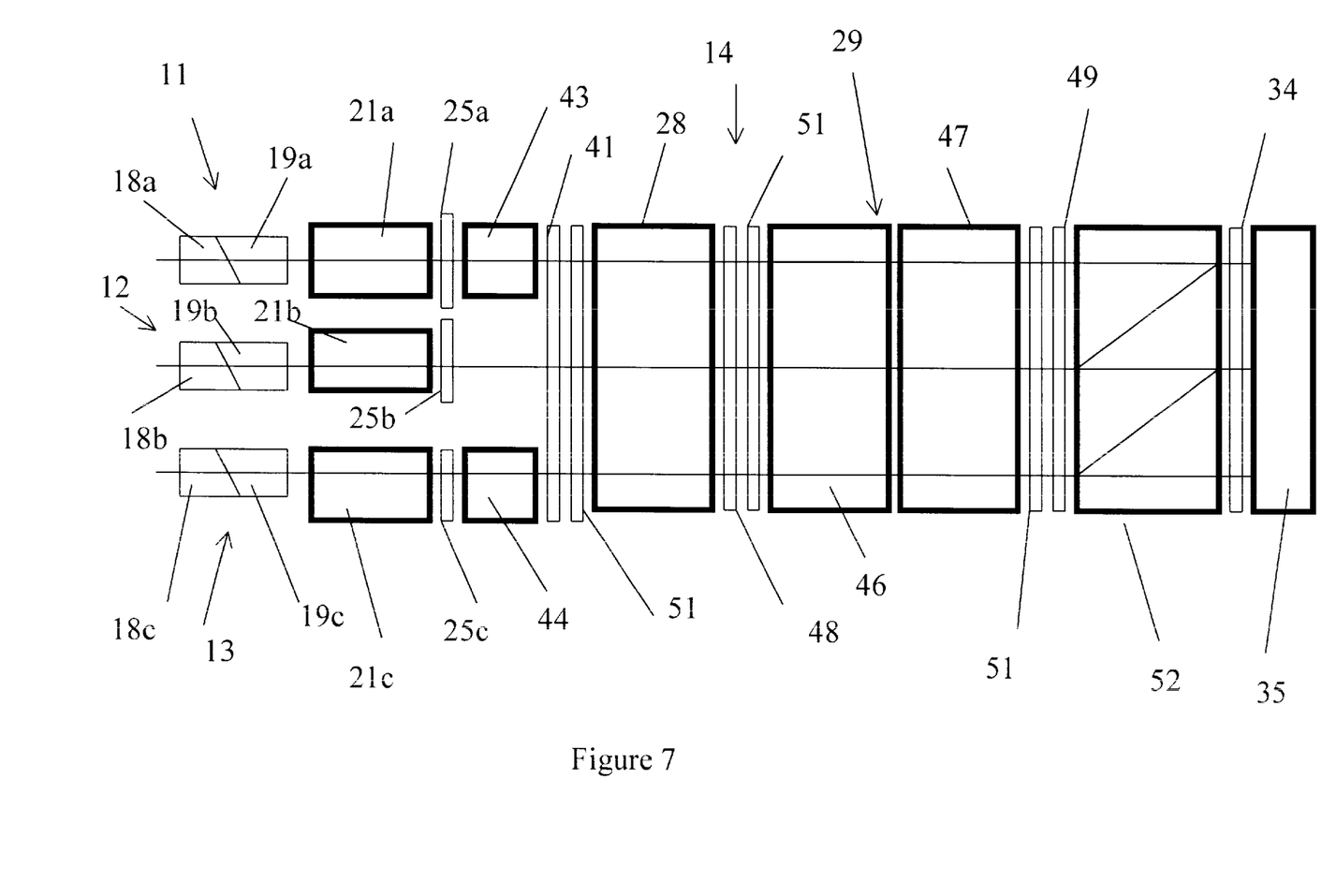
FIG. 7 is a schematic side view of the bi-directional circulator of FIG. 6.

A walk-off crystal 52 is provided to separate the odd channels from the even channels, rather than the PBS stack 15. Accordingly, the odd number channels would still pass directly through the walk-off crystal 52, while the even number channels get deflected at an angle towards the path taken by the previous port's odd numbered channels (See FIG. 7). The quarter wave plate 34 performs the same function as above, i.e. to flip the polarizations of the sub-beams, whereby they travel back along different paths through the walk-off crystal 52 towards their respective output port.

Figure 8:
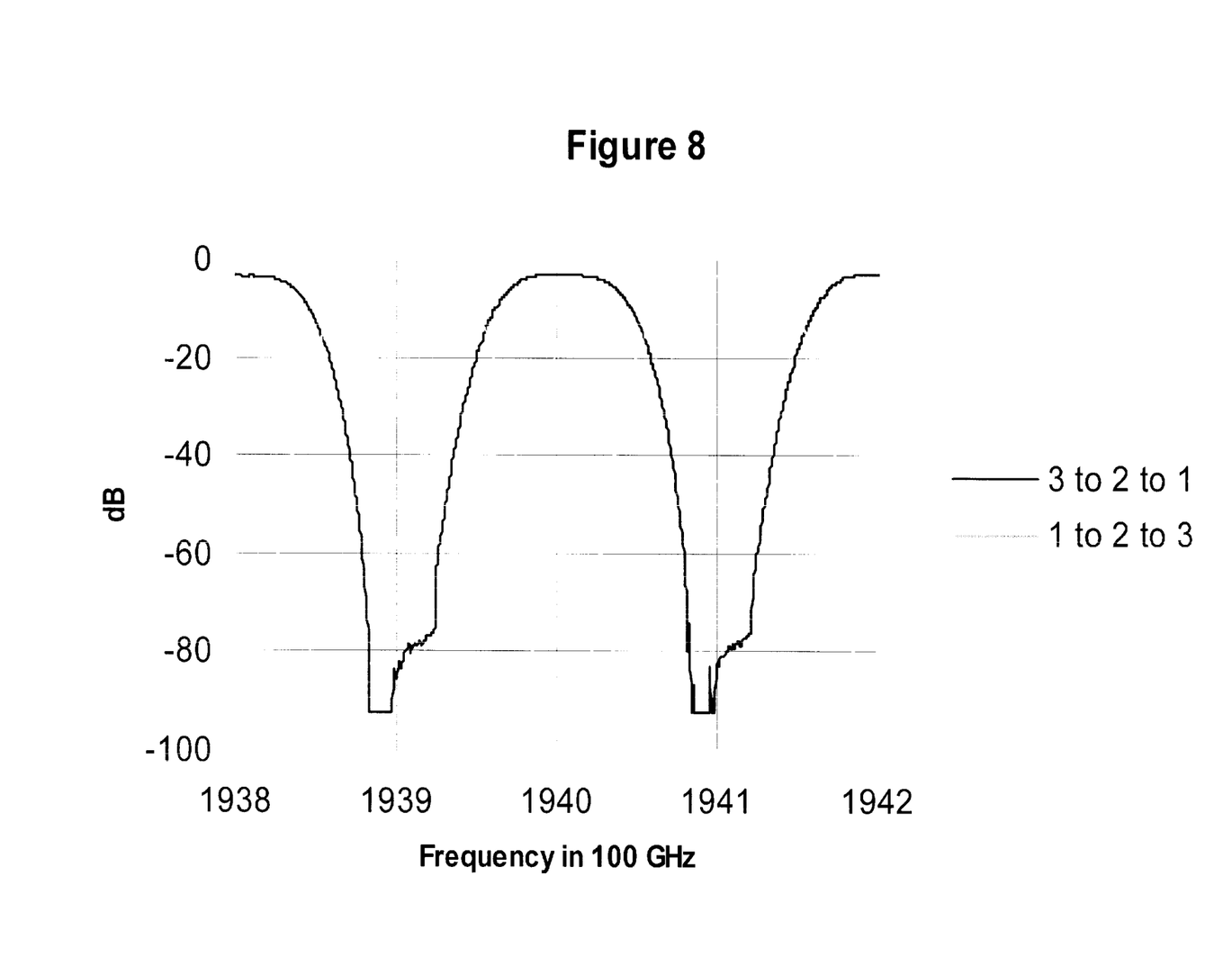
FIG. 8 illustrates a transmission response for the bi-directional circulator according to FIGS. 2 to 7.

FIG. 8 illustrates a transmission response for a bi-directional interleaving circulator according to the present invention. Curve 81 illustrates a transmission function for odd ITU channels according to one embodiment of the present invention, while curve 82 illustrates a transmission function for even ITU channels.

Figure 9:
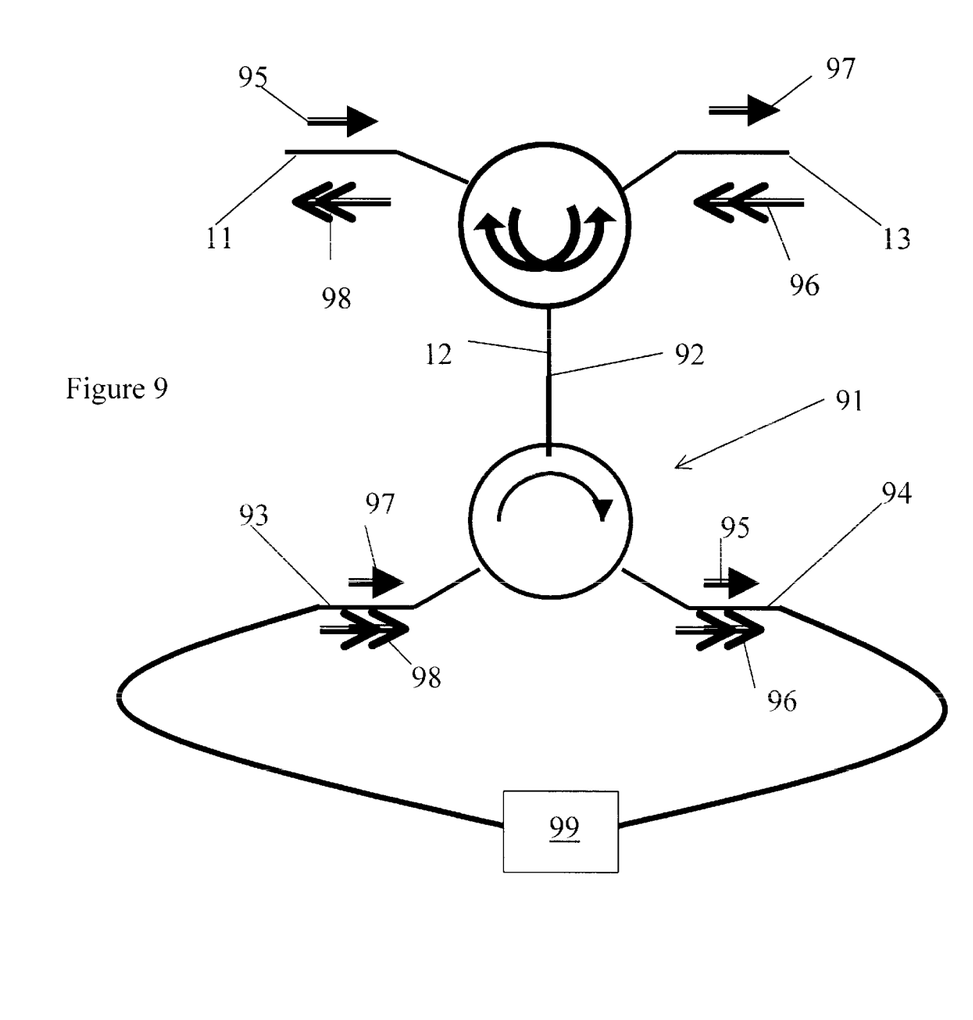
FIG. 9 is a conceptual representation of a bi-directional three port optical circulator in combination with a conventional uni-directional three port circulator.
Figure 10:
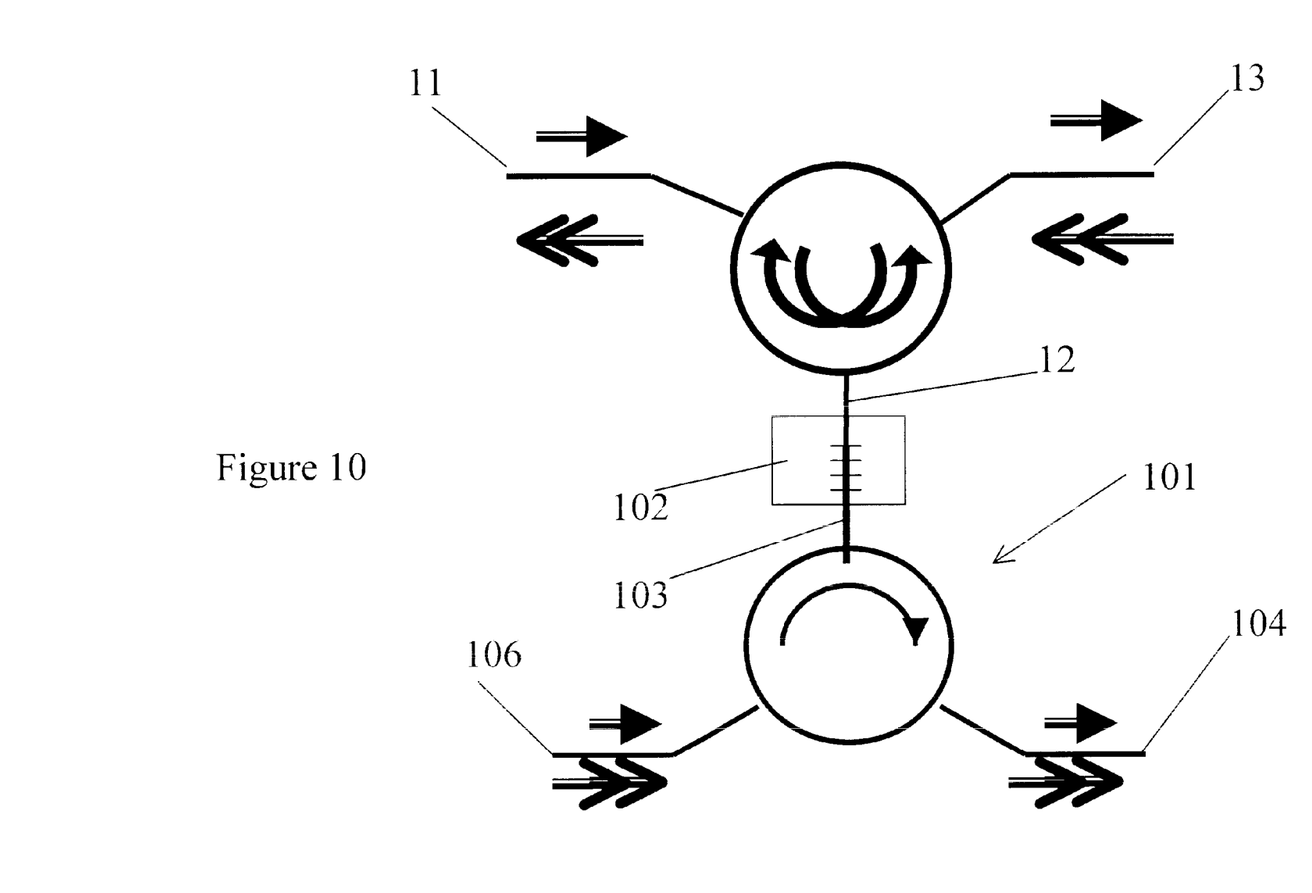
FIG. 10 is a conceptual representation of a bi-directional three port optical circulator in combination with a conventional uni-direction three port circulator with an optical filter therebetween.

With reference to FIG. 9, the bi-directional circulator according to the present invention can be combined with a conventional three port circulator 91 to provide a four port device, which has two bi-directional ports and two unidirectional ports. The two bi-directional ports correspond to the first and third ports 11 and 13, respectively, of the bi-directional circulator, while the second port 12 thereof is coupled to a middle port of the uni-directional circulator forming an input/output port 92. The conventional three-port device 91 also includes an input port 93 and an output port 94. With this arrangement, odd numbered channels 95 input the first port 11 and even numbered channels 96 input the third port are both routed to the output port 94. Furthermore, odd numbered channels 97 input the input port 93 get routed to the third port 13, while even numbered channels 98 input the input port 93 get routed to the first port 11. Accordingly, signals traveling in opposite directions through the system can be passed in the same direction through an optical assembly 99 coupled between the output port 94 and the input port 93. The optical assembly can be any one or more of: an erbium doped fiber amplifier (EDFA), a fiber Bragg grating (FBG) in transmission, a dynamic gain equalizer (DGE) in transmission, a configurable add/drop multiplexer (COADM) in transmission, a network monitoring device in transmission, and a isolating device FIG. 10 illustrates another four port device constructed from a bi-directional three port device and a uni-directional three port device 101. In this case, a wavelength filter 102, e.g. a fiber Bragg grating, is coupled between the second port 12 and the middle port 103 of the unidirectional three port device 101. The wavelength filter 102 is designed to drop one or more selected channels from the streams of channels traveling between the first port 11 and the third port 13 in the bi-directional circulator. With this arrangement, the selected channels traveling in either direction will be routed to DROP port 104. Moreover, if the selected channels are launched into the system via ADD port 106, they will pass through the wavelength filter 102 and be distributed to the appropriate port, i.e. the first port 11 or the third port 13, depending upon whether the selected channels are even or odd numbered ITU channels.

Figure 11:
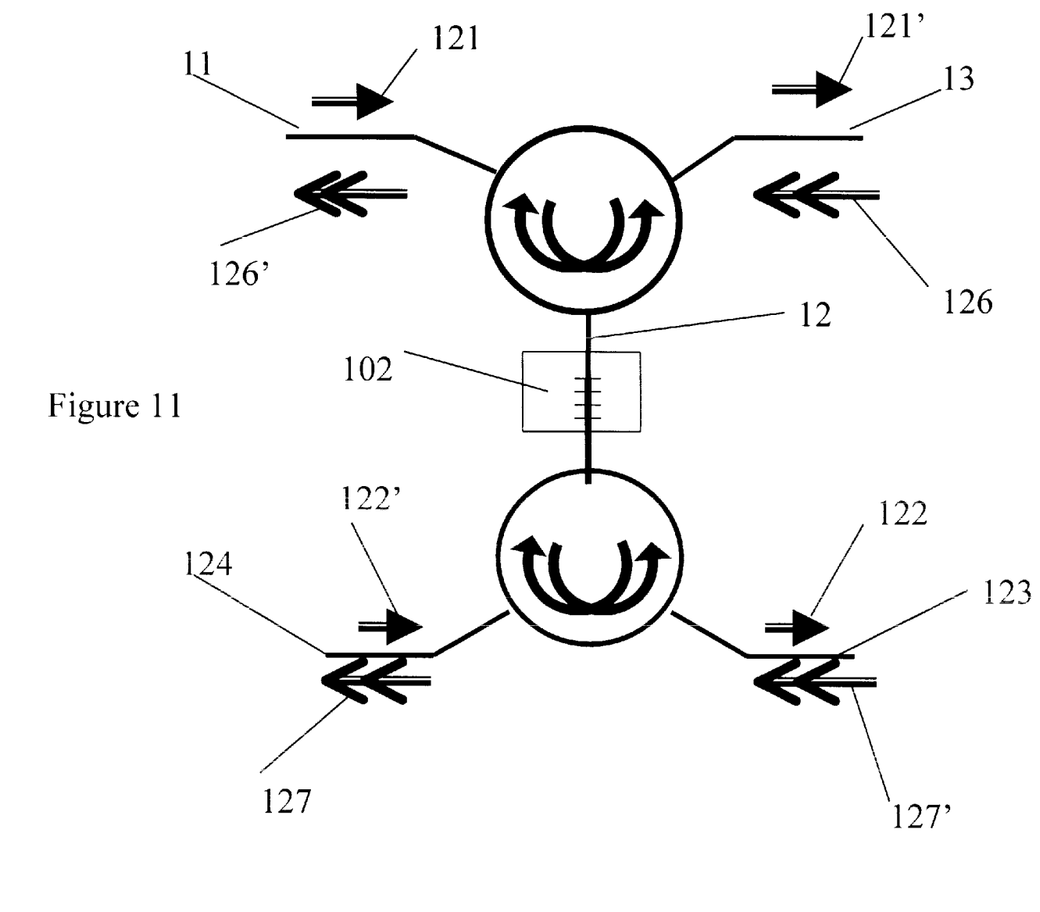
FIG. 11 is a conceptual representation of two bi-directional three port optical circulators in combination with an optical filter therebetween.

If two bi-directional circulators are combined with a wavelength filter 102 coupled therebetween, a four port bi-directional ADD/DROP device is configured as in FIG. 11. In practice, an optical beam comprised of odd numbered channels 121 is launched via the first port 11, and gets routed to the second port 12, which is coupled to the wavelength filter 102. The wavelength filter 102 passes selected channels 122 to the first ADD/DROP port 123, and reflects the remaining channels to the third port 13. If other signals 122', having the same wavelengths as the selected channels, are launched via a second ADD/DROP port 124, the wavelength filter 102 will combine them with the remaining channels forming odd channels 121' for output the third port 13. Similarly, if an optical beam comprising even number channels 126 is launched via the third port 13, selected channels 127 will be dropped to the second ADD/DROP port 124, while channels 127' launched via the first ADD/DROP port 123 get combined with the remaining channels from 126 to form even channels 126'.

Figure 12:
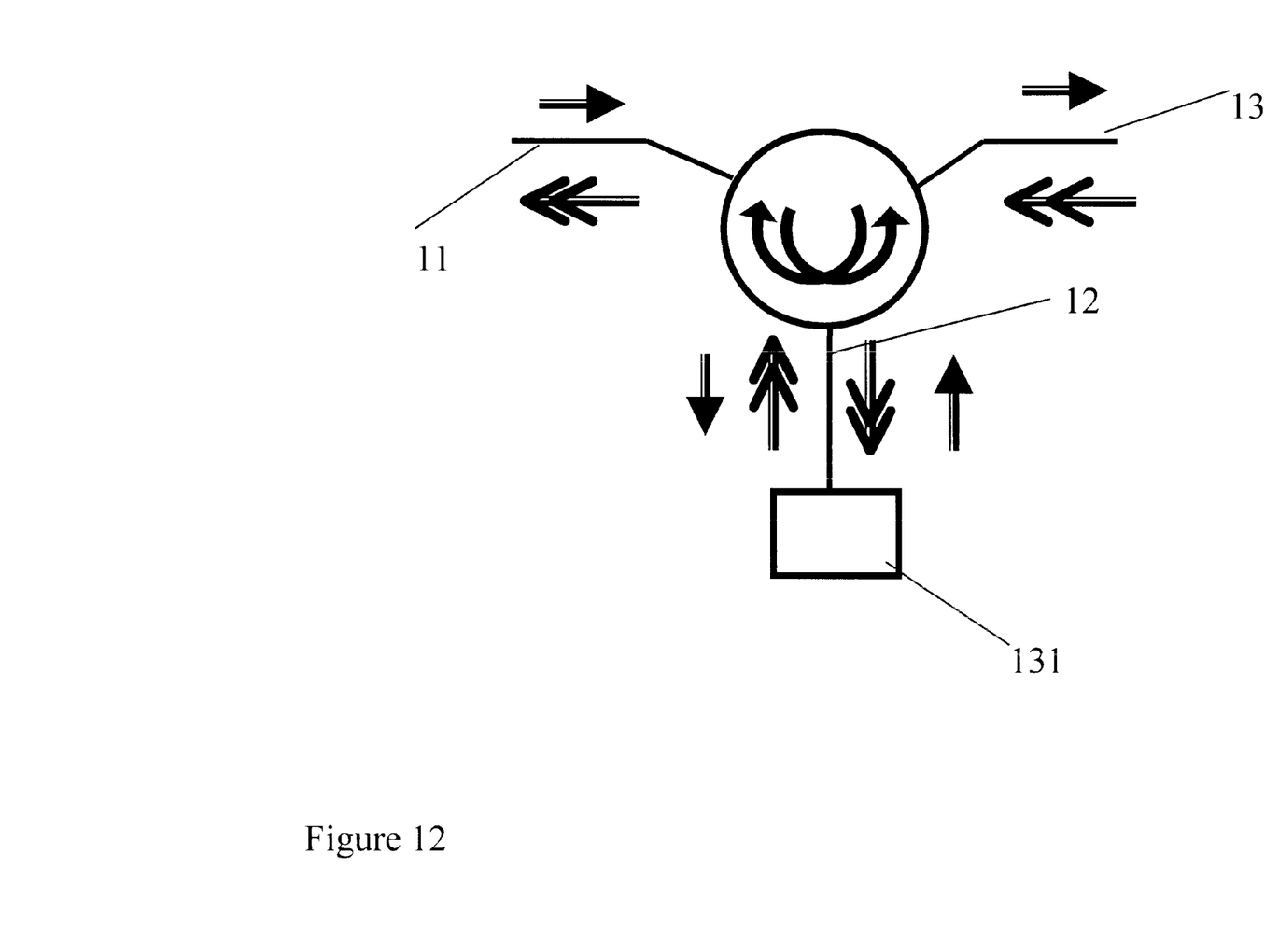
FIG. 12 is a conceptual representation of a bi-directional circulator in combination with a reflective optical device.

FIG. 12, illustrates a device that couples a reflective device 131 to the second port 12 of the bi-directional circulator of the present invention. In so doing, the first and third ports 11 and 13 remain bi-directional, while the second port 12 is closed-off from any signals from outside the system. The reflective device 131 can be any one of many optical devices, such as a dynamic gain equalizer (DGE) in reflection, a configurable add/drop multiplexer (COADM) in reflection, a thin film filter, a fiber Bragg grating, a network monitoring device, and a dispersion compensation device.

Figure 13:
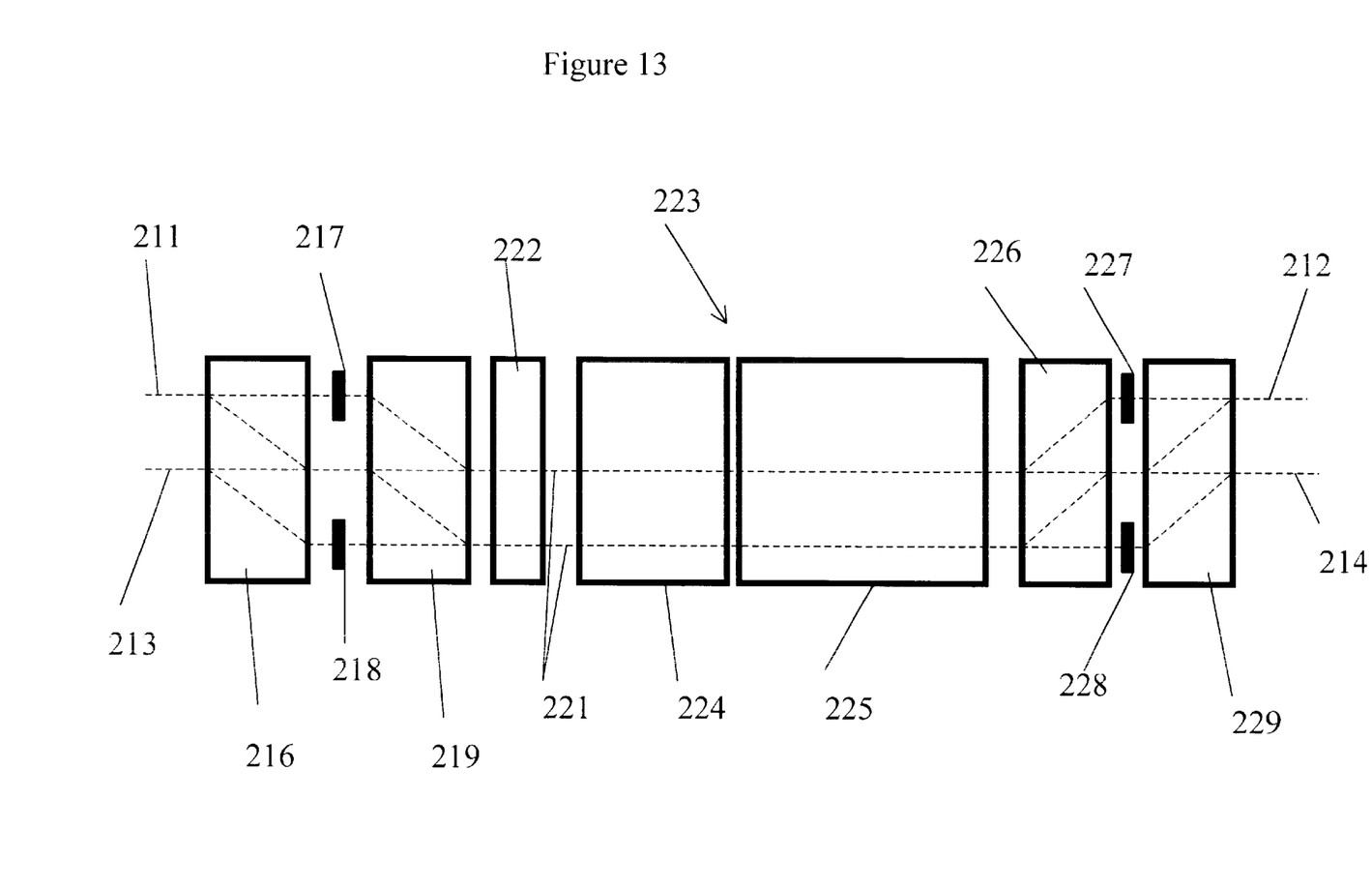
FIG. 13 is a schematic top view of a closed four port bi-directional circulator according to the present invention.

A closed four-port bi-directional interleaving circulator is illustrated in FIG. 13, and includes a first port 211, a second port 212, a third port 213 and a fourth port 214. The four-port device also includes a first beam splitter/combiner 216 optically coupled to the first and third ports 211 and 213. The first beam splitter/combiner is in the form of a walk-off crystal for splitting incoming beams into orthogonally polarized sub-beams and for combining outgoing orthogonally polarized sub-beams. Half wave plate 217 is positioned in the path of the ordinary sub-beam from the first port 211, while half-wave plate 218 is positioned in the path of the extraordinary sub-beam from the third port 213. This ensures that the sub-beams from the first port 211 have the same polarization, and that the sub-beams from the third port 213 have the same polarization, but the polarization of sub-beams from the first port 211 is orthogonal to the polarization of the sub-beams from the third port 213. Accordingly, a first beam director 219, in the form of a walk-off crystal, is able to direct both pairs of sub-beams along a main optical path 221 of the device.

A non-reciprocal rotator 222, preferably comprised of a Faraday rotator and a half wave plate, is positioned in the main optical path 221. The non-reciprocal rotator has no effect on sub-beams passing from the first and third ports 211 and 213 to the second and fourth ports 212 and 214, but rotates the polarization of sub-beams traveling in the opposite direction by 90°, for reasons that will be explained in detail later.

Again, a stack of waveplates 223, including a first element 224 of length L at 45° to the incoming beam and a second element 225 of length 2L at 105°, is provided to filter the signals and to selectively rotate the polarization of one set of channels.

A second beam director 226 is provided to direct the pairs of sub-beams towards the second port 212 or the fourth port 214 depending on the polarization of the sub-beams. Preferably, the second beam director 226 is also in the form of a walk-off crystal. Half-wave plates 227 and 228 rotate the polarization of one sub-beam from each pair of sub-beams, so that each pair of sub-beams has an ordinary and an extraordinary sub-beam as with the first and third ports 211 and 213. The ordinary and extraordinary sub-beams can then be combined in a second beam splitter/combiner 229 for output the respective port 212 or 214. Obviously, this arrangement can also be used for inputting signals into the device as described above in relation to the first and third ports 211 and 213.

In practice, a first signal comprising one or more channels from a first set of channels, e.g. odd ITU channels, is launched through the first port 211. The first beam splitter/combiner 216 divides the signal into two orthogonally polarized sub-beams, i.e. an o-beam and an e-beam. The o-beam has its state of polarization rotated by 90° in waveplate 217, and the two e-beams get directed by the first beam director 219 to the main optical path 221. In the forward direction the non-reciprocal rotator 222 has no effect on the state of polarization of the sub-beams. In this case, since the first signal is comprised of channels from the first set of channels, the waveplate stack 223 also has no effect on the state of polarization of the sub-beams. Accordingly, the second beam director 226 directs the e-beams towards the second port 212. Waveplate 227 rotates the polarization of one of the sub-beams, whereby the sub-beams can be combined in the second beams splitter/combiner 229 for output the second port 212.

If a similar signal comprising channels from the first set of channels, e.g. odd ITU channels, is launched through the second port 212, it will retrace the same path as the aforementioned signal except when it reaches the non-reciprocal rotator 222. At this point, the polarization of the sub-beams will be rotated by 90°, e.g. from e-beams to o-beams. As a result, the first beam director 219 will pass the sub-beams therethrough towards the third port 213. Waveplate 218 will rotate the polarization of one of the sub-beams, whereby the first beam splitter/combiner 216 will combine the sub-beams for output the third port 213.

For a similar signal input the third port 213, waveplate 218 ensures both of the sub-beams are o-beams. Since these sub-beams will remain o-beams through the non-reciprocal rotator 222 and the waveplate stack 223, the second beam-director 226 directs them towards the fourth port 214, wherein the polarization of one of the sub-beams is rotated by the waveplate 228, and the sub-beams are combined by the second beam splitter/combiner 229.

The illustrated circulator is a closed four-port bi-directional circulator, whereby if a signal comprising channels from the first set of channels, e.g. odd ITU channels, is launched through the fourth port 214, it will be output the first port 211. Again, this is due to the waveplate 228, which ensures both sub-beams are o-beams, and the non-reciprocal rotator 222, which changes the polarization of the originally o-polarized sub-beams to e-beams, whereby the first beam director directs them to the first port 211.

According to the aforementioned example odd ITU channel signals get routed from the first port 211 to the second port 212, from the second port 212 to the third port 213, from the third port 213 to the fourth port 214, and from the fourth port 214 to the first port 211.

If a signal comprising channels from a second set of channels, e.g. even ITU channels, is input the first port 211, it gets manipulated the same as the odd channel signal described above, except when it passes through the waveplate stack 223. The waveplate stack 223 is designed to rotate the polarization of the even channel wavelengths, thereby changing originally e-polarized beams to o-beams and vice versa. Accordingly, even channel signals entering the first port 211 get routed to the fourth port 214, and even channel signals entering the third port 213 get routed to the second port 212. Even channel signals entering the second port 212 originally become e-polarized sub-beams for direction to the main optical path 221. The waveplate stack 223 and the non-reciprocal rotator 222 each rotate the polarization of the sub-beams by 90°, and therefore have no cumulative effect on them. Accordingly, the e-beams originating from the second port 212 remain e-beams and get directed out the first port 211, while the o-beams originating from the fourth port 214 remain o-beams and get directed out the third port 213.

Figure 14:
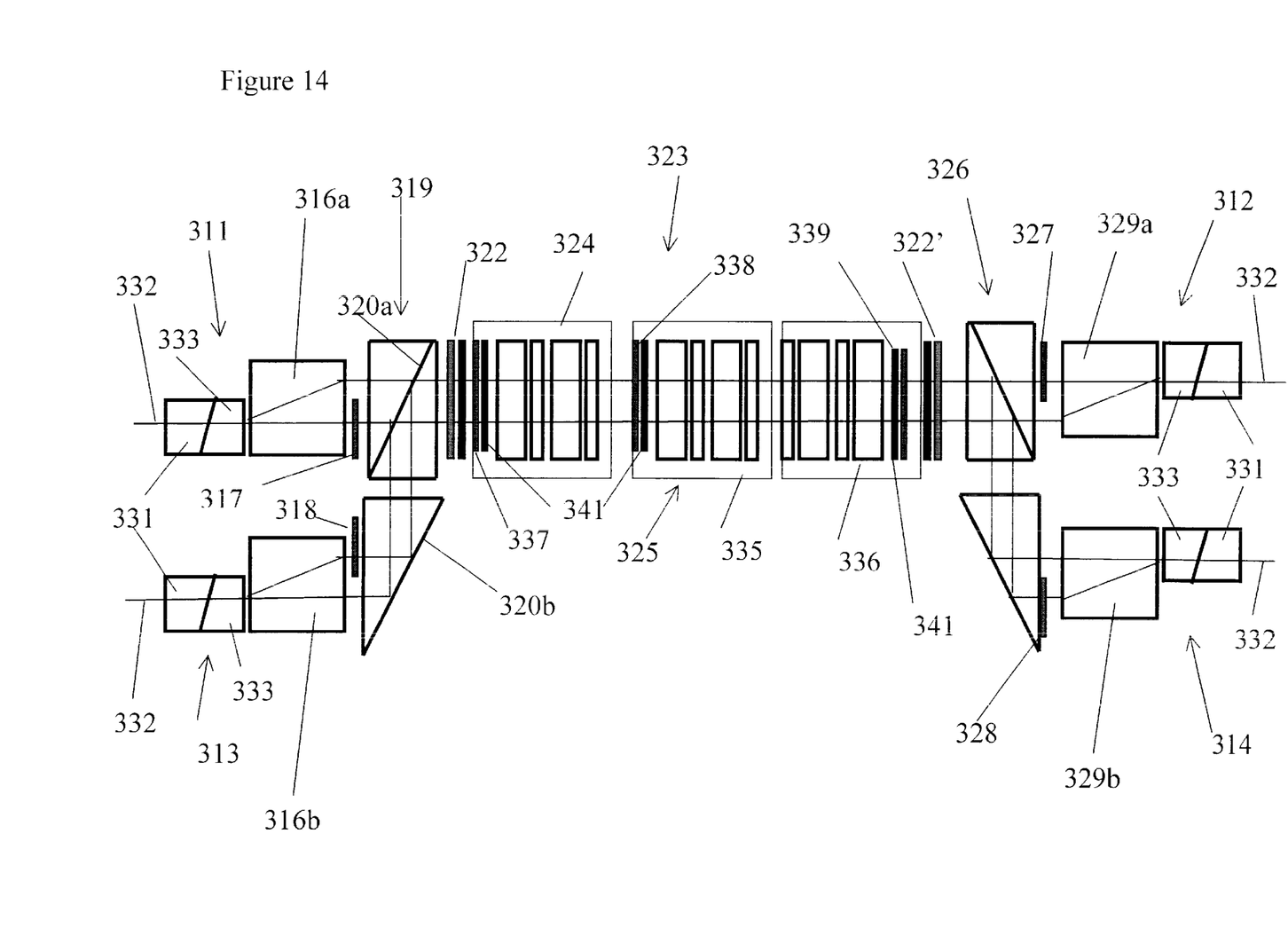
FIG. 14 is a schematic top view of another embodiment of a closed four port bi-directional circulator according to the present invention.

Another embodiment of the four-port bi-directional circulator is illustrated in FIG. 14, and includes a first port 311, a second port 312, a third port 313 and a fourth port 314. The first and third ports 311 and 313 are provided with walk-off crystals 316a and 316b, respectively, for splitting and combining sub-beams. The waveplates 317 and 318 function the same as waveplates 217 and 218, thereby ensuring sub-beams from the first port 311 are orthogonally polarized to sub-beams from the third port 313. In this embodiment, the first beam director 319 is in the form of a polarization beam splitter (PBS) assembly. In the illustrated design reflective coatings 320a and 320b are designed to reflect o-polarized beams and pass e-polarized beams. A non-reciprocal rotator 322 is provided and performs the same function as the non-reciprocal rotator 222. A back-up non-reciprocal rotator 322' can be provided to ensure proper isolation. A waveplate stack 323 is comprised of a first birefringent element 324 of length L, and a second birefringent element 325 of length 2L. A second beam director 326, comprised of a PBS assembly, directs e-polarized sub-beams to the second port 312 and o-polarized sub-beams to the fourth port 314. Waveplates 327 and 328 perform the same function as waveplates 227 ad 228, i.e. making the pairs of sub-beams from the second and fourth ports 312 and 314 orthogonally polarized. Beam splitter/combiners 329a and 329b are provided at the second and fourth ports 312 and 314, respectively, for splitting incoming beams and combining outgoing sub-beams.

Each port consists of a ferrule 331, surrounding an end of an optical fiber 332, coupled to a lens 333. The lenses 333 are typically ¼-pitch graded index (GRIN) lenses.

The second birefringent element 325 consists of two sets of birefringent crystals 335 and 336, each of which is identical to the first birefringent element 324. Each of these sets of birefringent crystals 335 and 336 are comprised of a plurality of different types of crystals, e.g. $YVO_4$ $TiO_2$ etc., to provide improved temperature stability.

Rather than orient the birefringent elements 324 and 325 at various angles, waveplates 337, 338 and 339 are provided to ensure that the sub-beams enter the birefringent elements 324 and 325 at the desired angle.

As in the device illustrated in FIG. 6, tuning plates 341 are provided before, after and between the birefringent elements 324 and 325 for fine tuning the orientations of the sub-beams.

We claim:

1. A bi-directional circulator comprising:
   a first port for inputting and outputting optical signals;
   a second port for inputting and outputting optical signals;
   a third port for inputting and outputting optical signals; and
   routing means for directing optical signals comprising wavelength channels from a first set of wavelength channels from the first port to the second port and from the second port to the third port, while preventing optical signals comprising wavelength channels from a second set of wavelength channels from passing thereto, and for directing optical signals comprising wavelength channels from the second set of wavelength channels from the third port to the second port and from the second port to the first port, while preventing optical signals comprising wavelength channels from the first set of wavelength channels from passing thereto.

2. The bi-directional circulator according to claim 1, wherein the routing means comprises:
   wavelength selective polarization rotating means for rotating the polarization of one of the sets of wavelength channels, while having no cumulative effect on the polarization of the other set of wavelength channels; and
   polarization dependent beam directing means for directing the signals from one port to another based on the polarization of the signals.

3. The bi-directional circulator according to claim 1, further comprising a unidirectional circulator, which includes:
   an input port for inputting signals with either set of wavelength channels;
   an input/output port optically coupled to the second port for outputting the signals from the input port to the second port, and for inputting signals from the first and third ports; and
   an output port for outputting the signals input from the input/output port;
   whereby when signals are input via the first and third ports, they pass through the input/output port and are output via the output port; and whereby when signals are input the input port, they pass through the input/ output port and are output the first port or the third port.

4. The bi-directional circulator according to claim 1, further comprising a uni-directional circulator, which includes:
   an add port for inputting signals with either set of channels;
   a connecting port optically coupled to the second port and including selective optical filtering means for passing at least one selected channel from the signals input via the add port, and for passing at least one selected channel from the signals input via the first and third ports; and a drop port for outputting the at least one selected channel from the signals input from the first and third ports;

whereby when signals are input via the first and third ports, at least one selected channel thereof passes through the connecting port and is output via the drop port; and whereby when signals are input the add port, at least one selected channel thereof passes through the connecting port and is output the first port or the third port.

5. The bi-directional circulator according to claim 1, further comprising another bi-directional circulator, which includes:

a first add/drop port for inputting a signal with at least one wavelength channel from the first set of wavelength channels, and for outputting a signal with at least one wavelength channel from the second set of wavelength channels input via the third port;

a second add/drop port for inputting a signal with at least one wavelength channel from the second set of wavelength channels, and for outputting a signal with at least one wavelength channel from the first set of wavelength channels input via the first port; and a connecting port optically coupled to the second port and including selective optical filtering means for passing at least one selected wavelength channel from the signals input via the first and second add/drop ports, and for passing at least one selected wavelength channel from the signals input via the first and third ports;

whereby when signals are input via the first and third ports, at least one selected wavelength channel thereof passes through the connecting port and is output via the second and first add/drop ports, respectively;

whereby when a signal with at least one wavelength channel from the first set of wavelength channels is input the first add/drop port, at least one selected wavelength channel thereof passes through the connecting port and is output the third port; and whereby when a signal with at least one wavelength channel from the second set of wavelength channels is input the second add/drop port, at least one selected wavelength channel thereof passes through the connecting port and is output the first port.

6. The bi-directional circulator according to claim 1, further comprising a reflective optical device optically coupled to the second port for reflecting optical signals output the second port back through the second port.

7. The bi-directional circulator according to claim 2, wherein the wavelength selective polarization rotating means comprises a birefringent crystal interleaver assembly.

8. The bi-directional circulator according to claim 7, wherein the birefringent crystal interleaver includes a first birefringent element of length L and a second birefringent element of length 2L.

9. The bi-directional circulator according to claim 7, wherein the first, second and third ports are superposed on one end of the birefringent crystal interleaver assembly, and the polarization dependent beam directing means is positioned on the other end of the birefringent crystal interleaver assembly; and wherein the polarization dependent beam directing means comprises:

a polarization beam splitting means for directing signals with a first polarization in one direction and signals with a second polarization in another direction; rotator means for rotating the polarization of wavelength channels by 90°; and reflecting means for directing the signals back through the polarization beam splitting means and the birefringent crystal interleaver assembly for a second pass.

10. The bi-directional circulator according to claim 7, further comprising a fourth port;

wherein the first and third ports are positioned on one end of the birefringent crystal interleaver assembly, and the second and fourth ports are positioned on the other end of the birefringent crystal interleaver assembly; and wherein the routing means further directs optical signals comprising wavelength channels from the first set of wavelength channels from the third port to the fourth port and from the fourth port to the first port, while preventing wavelength channels from the second set of wavelength channels from passing thereto, and further directs optical signals comprising wavelength channels from the second set of wavelength channels from the fourth port to the third port and from the first port to the fourth port, while preventing wavelength channels from the second set of wavelength channels from passing thereto.

11. The bi-directional circulator according to claim 9, wherein the polarization beam splitter means comprises a walk-off crystal or a plurality of polarization beam splitting cubes.

12. The bi-directional circulator according to claim 9, further comprising:

first polarization setting means for ensuring optical signals launched via the first, second and third ports have a first polarization; and second polarization setting means for ensuring optical signals exiting the first, second and third ports have the first polarization.

13. The bi-directional circulator according to claim 9, further comprising a fourth port superposed on the first, second and third ports; wherein the routing means further directs optical signals comprising wavelength channels from the first set of wavelength channels from the third port to the fourth port, while preventing wavelength channels from the second set of wavelength channels from passing thereto, and further directs optical signals comprising wavelength channels from the second set of wavelength channels from the fourth port to the third port, while preventing wavelength channels from the second set of wavelength channels from passing thereto.

14. The bi-directional circulator according to claim 12, wherein the first polarization setting means comprises: a walk-off crystal at each port for separating incoming signals into orthogonally polarized sub-beams; and waveplate means for rotating the polarization of at least one of the sub-beams until both of the sub-beams have substantially the same polarization; and wherein the second polarization setting means comprises a non-reciprocal rotator for rotating the polarization of signals exiting the birefringent crystal interleaver assembly after the second pass, while having no cumulative effect on the polarization of signals before entering the birefringent crystal interleaver assembly for a first pass.

15. The bi-directional circulator according to claim 10, wherein the polarization dependent beam directing means comprises:

first polarization beam splitting means for directing signals with a first polarization between the first port and the birefringent crystal interleaver assembly, and for directing signals with a second polarization between the third port and the birefringent crystal interleaver assembly; and second polarization beam splitting means for directing signals with the first polarization between the second port and the birefringent crystal interleaver assembly, and for directing signals with the second polarization between the fourth port and the birefringent crystal interleaver.

16. The bi-directional circulator according to claim 3, further comprising an optical device optically coupled between the output port and the input port, the optical device selected from the group consisting of an EDFA, a Fiber Bragg Grating, a DGE, a COADM, a network monitoring device, and an isolator.

17. The bi-directional circulator according to claim 4, wherein the selective optical filtering means is a Fiber Bragg Grating.

18. The bi-directional circulator according to claim 5, wherein the selective optical filtering means is a Fiber Bragg Grating.

19. The bi-directional circulator according to claim 6, wherein the reflective optical device is selected from the group consisting of a DGE, a COADM, a thin film filter, a Fiber Bragg grating, a network monitoring device, and a dispersion compensation device.

* * * * *